US006208116B1

United States Patent
Fischedick

(10) Patent No.: US 6,208,116 B1
(45) Date of Patent: Mar. 27, 2001

(54) METHOD FOR CHARGING BATTERIES, PARTICULARLY IN CORDLESS COMMUNICATION DEVICES

(75) Inventor: Thomas Fischedick, Raesfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/486,509

(22) PCT Filed: Jun. 18, 1998

(86) PCT No.: PCT/DE98/01679

§ 371 Date: Feb. 20, 2000

§ 102(e) Date: Feb. 20, 2000

(87) PCT Pub. No.: WO99/10961

PCT Pub. Date: Mar. 4, 1999

(30) Foreign Application Priority Data

Aug. 26, 1997 (DE) ................................ 197 37 146

(51) Int. Cl.⁷ .................................................. H01M 10/44
(52) U.S. Cl. ................................................. 320/125
(58) Field of Search ................... 320/124, 125, 320/127, 130, 132, 160

(56) References Cited

U.S. PATENT DOCUMENTS 5,497,067 * 3/1996 Shaw .
5,514,946 * 5/1996 Lin et al. .
5,828,201 * 10/1998 Hoffman, Jr. et al. .
5,869,950 * 2/1999 Hoffman, Jr. et al. .

FOREIGN PATENT DOCUMENTS

| 39 24 499 | 1/1991 | (DE) . |
|---|---|---|
| 42 25 703 | 4/1993 | (DE) . |
| 42 36 811 | 1/1994 | (DE) . |
| 41 05 769 | 9/1994 | (DE) . |
| 43 16 471 | 11/1994 | (DE) . |
| 43 39 363 | 6/1995 | (DE) . |
| 0 616 281 | 9/1994 | (EP) . |

* cited by examiner

Primary Examiner—Edward H. Tso
(74) Attorney, Agent, or Firm—Schiff Hardin & Waite

(57) ABSTRACT

In order to create a method with which, independently of the technology of the batteries utilized, a constant overcharging of the batteries is dependably avoided, even given a different capacity, particularly given a value deviating from the original capacity, and, thus, a long service life of the batteries can be assured, it is provided that an initial charging phase of the batteries after initial insertion into the device up to full charging is provided, that, subsequently, the batteries are at least partly discharged and a value representing the previously drawn capacity is generated at every point in time, that this generated value is compared at the beginning of a renewed charging phase with a stored base value representing the duration of the initial charging phase, and that subsequent charging phases follow whose duration is equal to that of the initial charging phase when the generated value is less than or equal to the base value or that subsequently charging phases follow whose duration is determined dependent on the generated value, said generated value, over and above this, being stored as new base value when it is higher than the original base value.

17 Claims, 3 Drawing Sheets

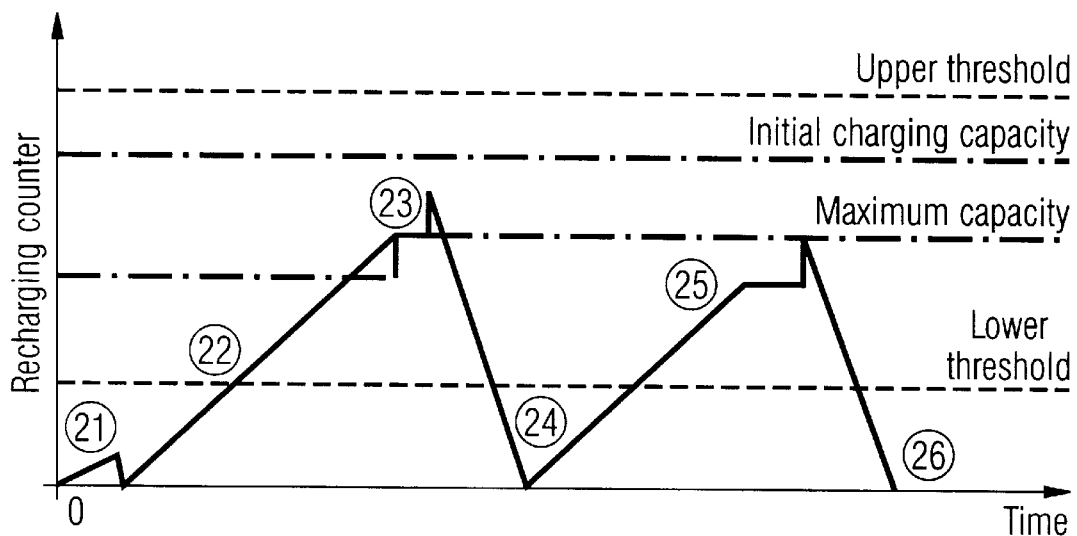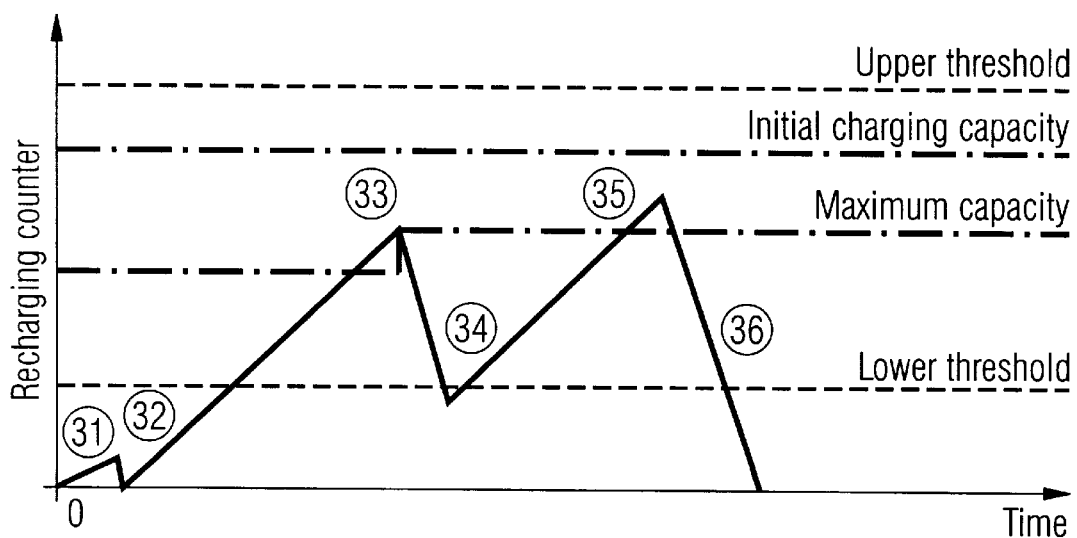

METHOD FOR CHARGING BATTERIES, PARTICULARLY IN CORDLESS COMMUNICATION DEVICES

The present invention is directed to a method for charging batteries, particularly in cordless communication devices.

In many types of electrical and electronic devices that are to be operated at least temporarily without a direct connection to the power network, particularly in mobile or cordless telephones, rechargeable batteries are mainly provided. These batteries are charged either in the fixed part of the respective device or in separate charging stations for re-use during mobile operation. A charging current matched to the battery utilized is thereby generated via a charging energy source, usually by a charging device connected to the power network, and this charging current is forwarded to the battery. However, particular emphasis must thereby be placed thereon that an overcharging of the batteries not occur, this leading to power losses, particularly given more frequent charging, and potentially leading to destruction in the worst case.

In order to avoid the overcharging of the batteries by the charging device of a cordless communication device, German Letters Patent 42 36 811 has proposed that the charging voltage be measured at certain time intervals and continuing to charge the batteries or ending the charging dependent on the course of the voltage charging curve that indicates the charging condition when rising, the charged condition when constant and the overcharging condition given subsequent drop. In particular, NiMH batteries having a significantly higher capacity than NiCd batteries are thus extremely sensitive to constant overcharging.

The exact measurement of the charging voltage curve with the required precision and under changing operating conditions, however, is often difficult to determine. On the other hand, the knowledge of the capacities of the batteries and their technology is a precondition for the disturbance-free and long-term operation in other methods for charging the batteries, so that switched batteries having a capacity and technology different from the original capacity and technology is not possible. The correct display of the charging condition or, the capacity of the new batteries is also not possible with the prior methods.

German Letters Patent 43 16 471 discloses a method for determining the charge condition of a rechargeable battery, whereby, in a measuring mode, the counter reading of an electronic counting device can be modified corresponding to the charging and discharge current and, in addition, is modified dependent on the actually existing residual capacity of the battery, whereby the counting device is supplied, on the one hand, with signals corresponding to the capacity of the battery, which decreases with age, and, on the other hand, with signals corresponding to the charged condition of the battery. The measuring mode comprises one or more adjustment cycles as well as one or more working cycles, whereby the adjustment cycle contains a discharge of the rechargeable battery up to the final discharge voltage, a charging up to fully charged, and, subsequently, another discharging to the final discharge voltage of the battery for determining the remaining capacity, and whereby, following the end of an adjustment cycle, at least one working cycle follows that begins with a full charging of the battery and that is followed by a discharge down to the final discharge voltage upon determination of the respective charged condition. The adjustment and working cycles are monitored with the counting device by administration of qualitative and quantitative measuring and control data. In a preferred exemplary embodiment of the method, the measuring mode comprises one adjustment cycle and many working cycles with a sequence of capacities, whereby each capacity is compared to that of the preceding work cycle and the result of the comparison is stored, and whereby the charging of the rechargeable battery in the following working cycle is determined by the comparison result from the preceding working cycle.

SUMMARY OF THE INVENTION

It is an object of the present invention to provide a method with which, regardless of the technology of the batteries utilizes, a constant overcharging of the batteries is dependably avoided even given different capacity, particularly given a value deviating from the original capacity and, thus, a long service life of the batteries can be assured. Further, a correct capacity display should be capable of being additionally automatically realized in the operated device.

This object is inventively achieved in accordance with the present invention in a method in that an initial charging phase of the batteries following initial insertion into the device up to full charging is provided; in that the batteries are subsequently at least partly discharged and a value representing the previously drawn capacity is generated at every point in time; in that, at the beginning of a renewed charging phase, this generated value is compared to a stored base value that represents the duration of the initial charging phase; and in that subsequent charging phases follow the initial charging phase wherein the batteries are at least partially charged when the generated value is less than or equal to the base value or wherein the batteries are at least partially charged dependent on the generated value that, over and above this, is stored as new base value when the generated value is higher than the base value hitherto stored and the batteries have a fully charged condition at the beginning of the discharge phase leading to the generated value. As a result of this method, the charging phases following the initial charging phase can be automatically exactly matched to the technology and capacity of the batteries utilized without the user having to input any data whatsoever of the batteries or having to implement adaptions himself, and without an overcharging of the batteries occurring during daily operation of the device, for example, a mobile radio telephone or a similar communication means. A longer and disturbance-free operation is thus assured without the user having to monitor the charging himself. The charging of the batteries can then always ensue quickly with maximum current without having to fear an overcharging. The at least partial discharging of the batteries following the initial charging phase can already advantageously occur as a result of the intended use of the device.

In an embodiment, there is provided a method for charging batteries, particularly in cordless communication devices, said method comprising the steps of:

inserting at least one battery into a device for a first time; after said insertion, during an initial charging phase, fully charging said battery;

after said full charging, at least partially discharging said battery;

generating at each point in time a value representing a capacity drawn up to said partial discharging;

after said partial discharge, given a start of a renewed charging phase, comparing said generated value to a stored base value representing a duration of said initial charging phase; and after said comparison, during subsequent charging phases following said initial charging phase, at least partially charging said battery when said generated value is one of less than or equal to said base value and when said generated value that, over and above this, is stored as a new base value when said generated value is higher than said base value hitherto stored and said batteries have a fully charged condition at a beginning of a discharge phase leading to said generated value.

In an embodiment, it is provided that the batteries are completely discharged after the initial charging phase and a value representing the drawn capacity is thereby generated; and in that subsequent charging phases follow thereupon, wherein the batteries are at least partially charged dependent on the generated value, which is also stored as new base value when the generated value deviates from the base value and the batteries have a fully charged condition at the beginning of the discharge phase leading to the generated value.

The exact capacity of the batteries with an arbitrary technology that are utilized and an initially unknown capacity can thus be even more precisely automatically recognized by the device itself without the user having to input these data, as a result whereof an exact matching of the charging cycles to the batteries utilized is permitted for avoiding overcharging.

For simplifying the operation of the device, in an embodiment, the duration of the initial charging phase and, thus, the base value is initially prescribed dependent on the maximum capacity of the initially employed batteries. The critical data for the standard equipment are thus prescribed, and the device can automatically control the optimum charging of the batteries from the very outset.

In an embodiment, the base value or the value generated on the basis of the drawn capacity is established as the value of a recharging counter, whereby the de-incrementation thereof ensues proportionally to the product of charging current measured during the charging phases and time. This incorporation of the charging current into the parameters that are monitored when charging the batteries is necessary since different charging currents are present under different feed conditions and this would lead to a deterioration of the balancing and, thus, of the charging event as well.

In an embodiment, upon employment of proven component parts and for simple and fast adaptation of the required values, it is provided according to a further feature the first, predetermined base value and every generated value of the re-charging counter to be stored is deposited in an EEPROM.

In an embodiment, charging is carried out in a first part of the initial charging phase, preferably 5.5 hours, with maximum current, and charging in the remaining part of the initial charging phase is undertaken with a lower current, preferably half the maximum current. Given this graduation, a harmful overcharging can be prevented to the farthest-reaching extent even during the initial charging phase when the capacity of the utilized batteries is not yet known.

In order to only enable the possibility for automatic recognition of the technology and the capacity of initially unknown batteries under conditions under which these data can be acquired, it is provided according to an advantageous version of the method that a condition allowing the overwriting of the base value is set in the device only when a complete initial charging phase has been run, the value generated on the basis of the partial discharging of the batteries is higher than the base value or the value generated on the basis of the complete discharge of the batteries deviates from the base value and the generated value lies within predetermined limits.

In an embodiment, upon utilization of proven technologies and component parts, it is preferably provided for this purpose that the condition allowing the overwriting of the base value is established by an initial charging flag that is reset in the EEPROM.

In an embodiment, in order, in addition to the dependable and automatic recognition of the capacity of the utilized batteries without action on the part of the user to be able to realize a dependable and exact display of the capacity and of the charging condition of arbitrary batteries that are utilized, likewise without needing any intervention on the part of the user, it is inventively provided that, in addition to the aforementioned features, the battery voltage is determined preceding the initial charging phase and after the initial insertion of the battery into the device, that this identified voltage is compared to a lower voltage threshold and a second, predetermined voltage value, and that a first display condition is generated when the identified voltage is lower than the lower threshold voltage, that a second display condition is generated when the identified voltage is less than or equal to the second, predetermined voltage value, and that a third display condition is generated when the identified voltage is higher than the second, predetermined voltage value. An initial display of the charging condition that is already relatively accurate can thus be automatically obtained for any batteries that are utilized and without the user of the device having to know and input any data whatsoever of the batteries.

In an embodiment, it is thereby advantageously provided that the second voltage value is averaged from a predetermined voltage value that represents the discharged condition of the batteries and a voltage value stored in the EPROM that represents the maximum charging voltage of the previously employed batteries. Given the standard equipping of the device, a very exact display of the charge condition is thereby already assured from the very outset.

In an embodiment, in a simple and proven way, a potentially new value for the maximum charging voltage of the batteries is stored in EEPROM after the initial charging phase.

In an embodiment, a very exact display of the charge condition and, as well, of the capacity of any arbitrary batteries introduced can be achieved without any and all necessity of inputting data on the part of the user when, it is provided that, following the initial charging phase, the value that is currently generated and represents the previously drawn capacity is compared to the base value for the maximum capacity to be drawn, and that a fourth display condition is generated when the identified voltage is lower than the lower voltage threshold, and that, dependent on the ratio of the current, generated value to the base value, further display conditions representing the charge condition of the batteries are generated. Following the initial, automatic recognition of the capacity of the batteries utilized, thus, a very exact display of the charge condition is automatically produced.

In an embodiment, a standard subdivision of the charge condition display that is standard in many devices can be realized with extremely high precision when, inventively, the first display condition is generated during every charging phase following the initial charging phase, when the current, generated value is between 0% and 33% of the base value, that the second display condition is generated when the current, generated value is between 34% and 66% of the base value, that the third display condition is generated when the current, generated value is between 67% and 99% of the base value, and that a fifth display condition is generated when the current, generated value is equal to the base value. The value of the recharging counter in relationship to the maximum capacity of the batteries is thereby again the basis.

In an embodiment, in order to already advantageously provide the prevention of harmful overcharging of the batteries during the initial charging phase, the charge voltage curve is monitored during every charging phase implemented with maximum current, and the charging is ended when the charging voltage over a defined time span has continuously dropped from a value previously achieved.

In an embodiment, in order to avoid the shut-off of the charging in operating conditions wherein fluctuations of the charging voltage curve occur but there is not yet any overcharging risk, it is advantageously provided that the monitoring of the charging voltage curve is suspended at the beginning of charging during a predetermined time span, given potential switching of the charging current and during the charging phases following the initial charging phase.

In an embodiment, in order to achieve enhanced security against damage to the batteries, it can be additionally provided that the temperature of the batteries is monitored during charging, and that at least two temperature thresholds are prescribed, whereby charging is carried with full charging current below the lower temperature threshold, charging is carried out with half the charging current between the lower and the higher temperature threshold, and maintenance charging, preferably with one-sixth of the full charging current, is implemented above the higher temperature threshold.

In an embodiment, each temperature threshold can be in turn divided into two sub-thresholds, whereby the intensity of the current of the charging current is switched in case of rising temperature of the batteries given the higher sub-threshold of the respective temperature threshold and in case of dropping temperature given the lower sub-threshold of the respective temperature threshold.

In an embodiment, in order to be able to realize an exact display of the discharged condition of any batteries utilized, it is provided that the discharge curve of the voltage is monitored, and the first display condition is generated when the voltage lies in a range around the value representing the discharge condition of the batteries, the gradient of the discharge curve exceeds a predetermined, negative value, and became more highly negative a predetermined plurality of times in succession, or when the lower end of the range around the value representing the discharged condition was reached.

These and other features of the invention(s) will become clearer with reference to the following detailed description of the presently preferred embodiments and accompanied drawings.

DESCRIPTION OF THE DRAWINGS

FIG. 3 is a timing diagram that explains the capacity recognition when the device was shut off before complete discharging of the batteries but the higher drawing of capacity than the previous maximum capacity.

FIG. 4 is a timing diagram for explaining the capacity recognition when the batteries of the device are again recharged before complete discharging.

DETAILED DESCRIPTION OF THE PRESENTLY PREFERRED EMBODIMENTS

Figure 1:
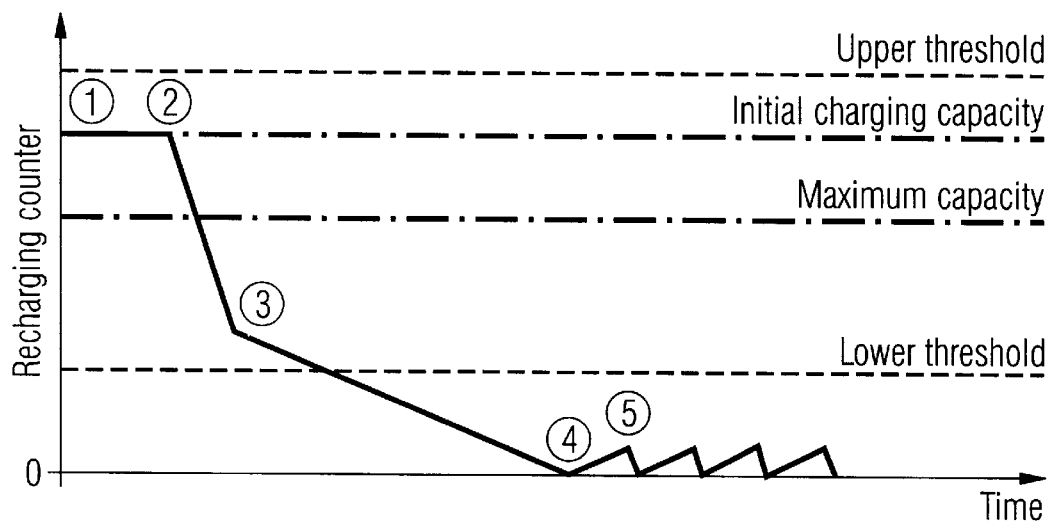
FIG. 1 is a timing diagram for explaining the running of an initial charging phase.

FIG. 1 shows how an initial charging phase can be designed, for instance for a standard equipping of a device operated with batteries. The standard capacity of the batteries that are provided is thereby initially assumed, for example a capacity 1200 mAh of a NiMH cell that is currently standard, and the duration of the initial charging phase is calculated for this. As value representing the duration of the initial charging phase, a recharging counter is set to a value corresponding to the calculation of the initial charging phase and is preferably stored in an EEPROM in the device. The value of the recharging counter is determined such that the batteries are fully charged once in any case. This condition corresponds to section 1 of the solid line in FIG. 1, which represents the value of the recharging counter and that is initially on the dot-dash level of the initial charging capacity. The meaningful limitations for the maximum capacity are symbolized by broken lines.

The initial phase of the batteries begins at 2. In order to prevent harmful overcharging, the initial charging is graduated. Charging is carried out with maximum current in a first time span, approximately 5.5 hours in the specific example, whereby the recharging counter is quickly de-incremented, as indicated by section 2–3 of the line in the diagram, and the remaining charging time, which derives from the maximum capacity and a charging factor with half the maximum charging current, which corresponds to the condition of section 3–4 in FIG. 1. This latter condition can, for instance, be realized in a simple way in that charging is carried out with maximum current for a specific, short time span, for example five minutes, and charging is then suspended for a time span of equal length.

The de-incrementation of the recharging counter during the charging phases ensues proportionally to the product of charging current and time. It is therefore also important for the correct balancing that the charging current flowing at the battery posts is monitored and measured. Thus, different feed conditions, for instance given operation of the device in different countries with different power supply conditions, can lead to different charging currents. Without measuring the charging current, the balancing of the inventive method would deteriorate given a change of the intensity of the charging current; given measurement of the charging current, its respectively current size can be utilized for the de-incrementation of the recharging counter.

The value of the charging current is initially determined by arithmetic averaging, preferably only obtained by sliding averaging over the further course, whereby each new value is weighted with a slight part, preferably with 1/128, so that potential "mavericks" do not falsify the overall result, for example due to load fluctuations.

When the device or the battery is not to be connected to the charging device effecting the charging of the batteries immediately or not during the entire time, the recharging counter is incremented corresponding to the power consumption via a corresponding counter circuit. In any case, however, a switch is made from maximum to half the charging current after a predetermined time span of the initial charging phase, i.e. the 5.5 hours here.

At 4, finally, the fully charged condition of the batteries is achieved, which preferably can be recognized via a dU criterion, which shall be explained later. An initial charging flag is reset in the EEPROM at the end of the initial charging phase and a switch is made such into an operating condition wherein an automatic capacity recognition of newly utilized batteries of different technologies and capacity is enabled. When, according to the current balancing, lower than a specific, slight part of the maximum capacity was drawn from the battery, for example more than 2% of this maximum capacity, a holding current is activated at 5 in FIG. 1, this preferably comprising approximately one-sixth of the maximum intensity of current.

Upon insertion of new batteries into the device, an initial display of the charge condition and/or of the capacity of the batteries can also be advantageously immediately realized, this being based on the measured battery voltage. To that end, a discharge voltage, for example 2.28 V, determine for the batteries, on the one hand, and on the other hand, a voltage deposited in the EEPROM are employed, the latter essentially corresponding to a fully charged condition of the batteries. After initial, preferably arithmetic averaging, i.e. after the reset, this average value is compared to the measured voltage value of the batteries and a first display is realized therefrom. Every further value of the battery voltage is preferably in turn obtained by the sliding averaging that was already explained above.

When the battery voltage is thereby lower than the discharge voltage, a display that signals the discharged condition of the batteries to the user is realized via traditional display driver circuits and, for example, upon employment of symbols standard for the corresponding devices. If the battery voltage happens to be equal to or less than the above average, then a display for signaling a charged condition of a maximum of one-third of the maximum capacity is realized, and a capacity display of a maximum of two-thirds of the maximum capacity is generated when the battery voltage is higher than said average. The user is thus always in the secure range and cannot be surprised by a discharge of the batteries but is actually more likely to be prompted to recharge too early at the start. Since, however, the battery voltage is not an absolute criterion for the charged condition of a battery, the duration of the initial charge is reduced to a value lower than full charge only in the latter condition, for example to 60%, in order to prevent damage due to overcharging.

When the devices then to be operated with different battery types, for instance NiCd technology or NiMH technology with different capacities as well, for instance 700 mAh or 1200 mAh, the newly utilized batteries are not to be parameterized by the user and an exact matching of the charging duration and an exact display of the capacity and/or of the charged condition should nonetheless be realized, an automatic recognition by the device is necessary. Given utilization of new batteries or turn-on and turn-off, initially, a determination of charge duration or display of charge condition can only ensue via the values only stored in the EEPROM.

When, however, the following criteria are met, a capacity or display balance can be implemented automatically by the device:

before use of the device, the accumulator must have had a fully charged condition or the fully charged condition must have been displayed. A longer use of the device with discharge of the batteries upon balancing of the power consumption must have occurred, this having proceeded up to automatic shut-off or up to the display of the discharged condition of the batteries, where upon the device was connected to the charging device; alternatively thereto, a new capacity can also be learned when the value of the recharging counter upon connection of the device with the charging device or shut off is higher than the value of the recharging counter representing the prior maximum capacity. Finally, the new capacity should like in a meaningful range, traditionally with a lower limit of 300 mAh and an upper limit of 2000 mAh.

In order to achieve a more exact display as user information, a fourth display, for instance a flashing symbol for empty batteries, and a fifth display for the fully charged condition of the batteries should also be additionally realized as user information, this likewise ensuing on the basis of the value of the recharging counter relative to the maximum capacity.

Figure 2:
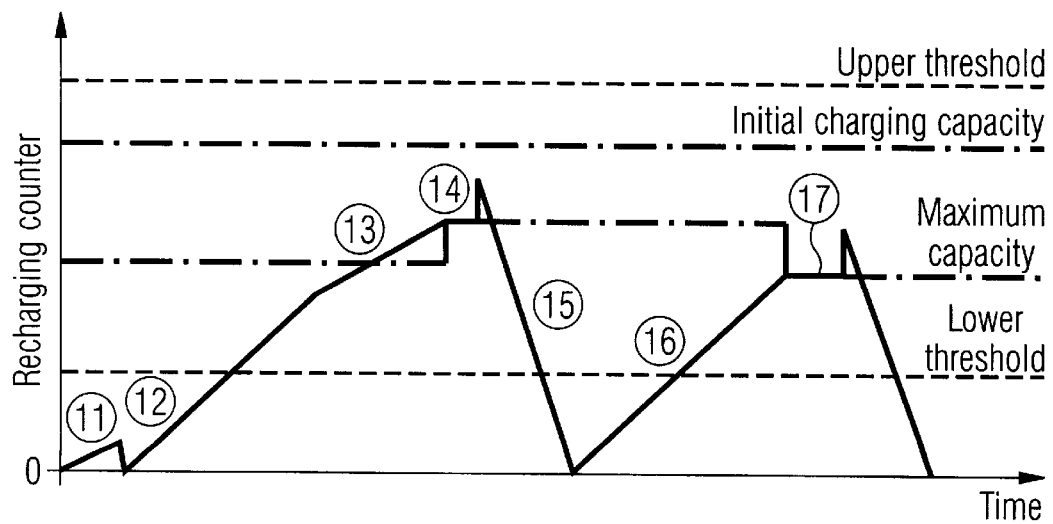
FIG. 2 is a timing diagram that explains the capacity recognition when the batteries have been discharged into their discharged condition.

FIG. 2 shows a diagram that explains the recognition of a new capacity deviating from the originally prescribed capacity when the accumulators, due to longer use of the device, reach the discharged condition. The point of departure is thereby the fully charged condition of the batteries at 11, at most only with holding charging that, for example, was achieved by a preceding, initial charging phase and that is represented by a minimum value of the recharging counter. The originally stored maximum capacity is again symbolized by a dot-dash line. The section 12 of the diagram corresponds to an active operation of the device with announcement incrementation of the recharging counter and, at 13, the device is in the standby mode wherein less power is consumed and the recharging counter therefore increases more slowly than in the active condition at 12. The empty charged condition of the batteries is then reached at 14, i.e. the accumulator voltage has dropped below the voltage threshold of, for example, 2.28 V that signals this condition. Before the automatic shut-off of the device, the current value of the recharging counter is stored in the EEPROM representing the new maximum capacity, this being identified by the higher level of the dot-dash line.

Since the duration of the shut-off of the device cannot be recognized, a predetermined part, preferably 10% of the maximum capacity, is incremented onto the current value of the recharging counter. Illustrated by section 15, the charging of the batteries up to the fully charged condition then ensues, represented by the value 0 of the recharging counter. This full charging advantageously ensues with maximum current, since, of course, the maximum capacity and the required charging of the batteries are now known and overcharging therefor need not be feared.

If other batteries then happen to be utilized in turn, these exhibiting a lower maximum capacity, an empty condition of the batteries is again achieved due to operation of the device, at 16, given a lower value of the recharging counter at 17, this being stored again as current value for the following charging phase, likewise again with the 10% incrementation for compensating the time span of the deactivation.

Another possibility for learning a new capacity is established when the device is turned off and the recharging counter signals a higher capacity level than in the prior condition. This version is shown in the diagram of FIG. 3.

The point of departure is again a fully charged condition of the batteries at 21, whereby the value of the recharging counter then increases in the region 22 due to use of the device, this being identified via current balancing. The device is then shut off at 23. Before the shut-off, the maximum capacity stored in the EEPROM—represented by the part of the dot-dashed line preceding the section 23—is compared to the content of the recharging counter. When this, as in FIG. 2, is higher, then this value of the recharging counter is stored as new maximum capacity and the following charging phase with maximum current is implemented up to the value zero of the recharging counter at 24. Here, too, the preceding incrementation of 10% of the maximum capacity again advantageously ensues.

After the fully charged phase and longer operation, the device is then shut-off again at 25. Since, however, the value of the recharging counter is lower here than the stored value for the newly learned maximum capacity, this is not modified and no new value is stored. The subsequent charging of the batteries up to the maximum capacity again ensues— following 10% incrementation—from the current value up to the value zero of the recharging counter.

FIG. 4, finally, shows as to how a new capacity of batteries can be learned. Fully charged batteries, at most with maintaining charge, at 31, again form the basis. Given operation of the device in section 32, the recharging counter is incremented and, finally, at 33, is connected to the charging device without a discharge condition of the batteries having been previously achieved. Since, however, the value of the recharging counter at 33 is higher than the previously stored maximum capacity, this new value is stored as new maximum capacity, this being symbolized by raising the dot-dashed line to a higher level.

Before, however, the following charging phase with complete charging of the batteries has been ended, the device is separated from the charging device and is placed back into operation, this being represented by the increase of the recharging counter in section 34 from a value unequal to zero up to a value at 35, this value lying above the maximum capacity. Since, however, fully charged batteries did not form the basis, one of the criteria for the learning method according to the invention was not established, so that the new value of the recharging counter is not stored as new maximum capacity and this, thus, remains unmodified.

In a following, full charging phase 36, thus, charging is carried out from the current value of the recharging counter up to the value zero with maximum current. Since the device was also not shut off, no compensatory incrementation as in the preceding examples ensues, either.

The above-described features for recognizing the capacity and the charged condition of newly inserted batteries can be realized as a fixed circuit but also, preferably, as a software version.

Finally, let it also be mentioned that a monitoring of individual parameters during charging is needed in addition to the measurement of the charging current already explained above, since, given overcharging of the batteries with a maximum current, the battery temperature and, thus, the internal cell pressure increase, in response whereto damage to the cells with deterioration of the service life and of the capacity up to destruction can occur.

The maximum charging voltage is thus followed-up for instance during full charging. When the charging voltage in turn drops by a specific amount, the procedure is aborted after a predetermined time span of continuous downward transgression, for example five minutes. During the initial time of full charging, for instance the first five charging minutes, when switching the charging current (for example, temperature measurement) and during normal charging, what is referred to as this "dU recognition" is turned off; otherwise, it is always active as soon as charging is carried out with maximum intensity of current. This occurs in order to prevent misconnections given voltage elevations at the start of charging or drops in voltage when switching off the charging current. When the charging voltage drops as a result of a change in load (for example, given a call, conversation, display illumination, etc. in the case of, for example, mobile telephones), then the maximum charging voltage is correspondingly corrected down.

Figure 5A:
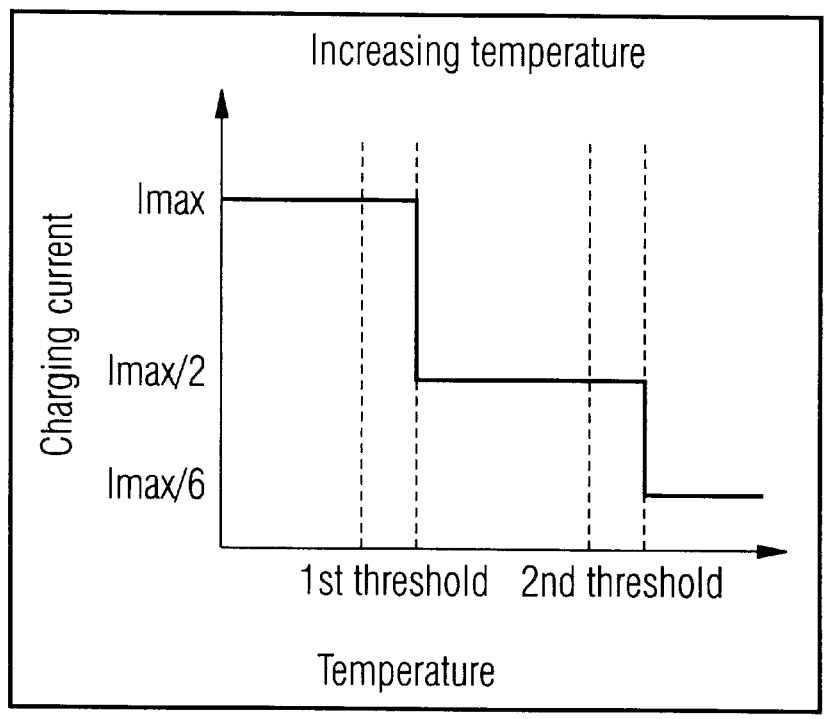
FIG. 5a is a timing diagram for explaining the temperature monitoring of the charging event for increasing temperature of the batteries.
Figure 5B:
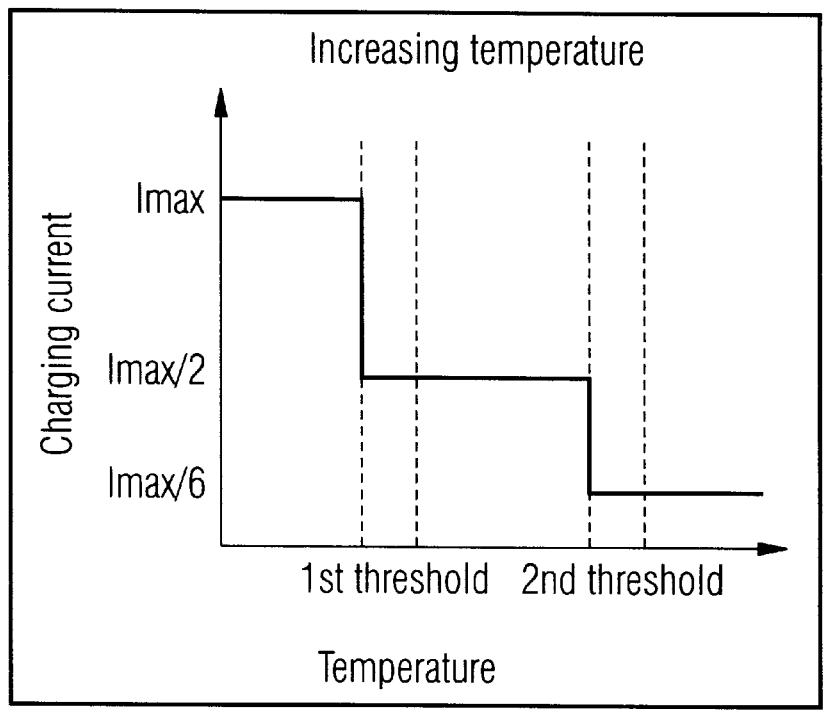
FIG. 5b is a timing diagram corresponding to FIG. 5a but for dropping temperature.

A further protective measure is the temperature monitoring shown in diagram form in FIGS. 5a and 5b. Temperature thresholds including hysteresis are defined for this purpose. When, during charging with maximum current, the upper value of one of two lower thresholds is reached, a switch is made to half the charging current. This can again be realized in a simple way by alternately charging with maximum current for a specific time span and subsequent interruption of charging for the same time span. When a second, upper threshold is reached, a switch is made to maintaining charging with, preferably, one-sixth of the maximum current and the current balancing is also switched off. This reduction in current given even increasing temperature is shown in FIG. 5a.

When the temperature subsequently sinks in turn, then charging with half the charging current as well as the current balancing are re-activated when the lower, second threshold is reached, as shown in FIG. 5b. When, following a further reduction in temperature, the lower, first temperature threshold has also been reached, the charging current, finally, is re-boosted to the maximum value for accelerated charging. A potential dU recognition must be suspended in all current switching events.

The battery temperature is preferably determined at specific time intervals, for example every five minutes whereby each measuring event contains a registration of 40 temperature values with subsequent, arithmetic averaging.

Finally, a reliable recognition of the discharged condition of the batteries shall also be discussed. A voltage window is defined around the previously determined reference value for the discharged condition, usually 2.28 V. The discharge curve gradient is determined therein, for example in a measuring grid having a spacing of one minute in order to report the discharge condition of the battery dependent on the battery employed in the voltage bend of the discharge curve, which ensues given a curvature of the discharge curve (second derivation).

The discharged condition is reported either when the lower limit of the window area has been reached or when the voltage lies in the window area, the gradient of the discharge curve is more negative than a predetermined value (in voltage drop-off/time), and the gradient was more highly negative than before a pre-determined number of times in succession, for example three times.

Given load changes, for example, for instance a call, conversation, etc., the last-described counting is reset because the discharged condition would otherwise be incorrectly signaled. Here, namely, there is a left-hand curvature of the discharge curve, whereas the discharged condition is to be reported given a right-hand curvature. The counting is also reset when the gradient no longer becomes more highly negative, whereby there is no longer a right-hand curvature or a mismeasurement.

What is claimed is:

1. A method for charging batteries, particularly in cordless communication devices, said method comprising the steps of:

inserting at least one battery into a device for a first time;

after said insertion, during an initial charging phase, fully charging said battery;

after said full charging, at least partially discharging said battery;

generating at each point in time a value representing a capacity drawn up to said partial discharging;

after said partial discharge, given a start of a renewed charging phase, comparing said generated value to a stored base value representing a duration of said initial charging phase; and after said comparison, during subsequent charging phases following said initial charging phase, at least partially charging said battery when said generated value is one of less than or equal to said base value and when said generated value that, over and above this, is stored as a new base value when said generated value is higher than said base value hitherto stored and said batteries have a fully charged condition at a beginning of a discharge phase leading to said generated value.

2. The method according to claim 1, further comprising the steps of:

following said initial charging phase, fully discharging said battery;

generating a value representing a drawn capacity from said fully discharging; and during subsequent charging phases following said initial charging phase, at least partially charging said battery dependent on a generated value that, over and above this, is stored as a new base value when said generated value deviates from said base value and said batteries have a fully charged condition at a beginning of a discharge phase leading to said generated value.

3. The method according to claim 1, wherein a duration of said initial charging phase and, thus, said base value is initially prescribed dependent on a maximum capacity of said initially used battery.

4. The method according to claim 1, further comprising the steps of:

establishing said base value as a value of a recharging counter, said recharging counter being de-incremented proportionally to a product of a charging current measured during said charging phases and time; and establishing said value generated on said basis of said drawn capacity as a value of a recharging counter, said recharging counter being de-incremented proportionally to said product of said charging current measured during said charging phases and time.

5. The method according to claim 4, further comprising the step of:

depositing said first, predetermined base value and each generated value of said recharging counter to be stored in an EEPROM.

6. The method according to claim 1, wherein said battery is charged with maximum current in a first part of said initial charging phase for about 5.5 hours; and wherein said battery is charged with lower current of about half said maximum current in a remaining part of said initial charging phase.

7. The method according to claim 1, further comprising the step of:

setting a condition in said device allowing an overwriting of said base value only upon condition of one of when a complete initial charging phase has been run, when a value generated on a basis of said at least partial discharge of said battery is higher than one of said base value, and when a value generated on a basis of said complete discharge of said battery deviates from said base value and said generated value lies within predetermined limits.

8. The method according to claim 7, further comprising the step of:

establishing said condition allowing said overwriting of said base value by an initial charging flag reset in an EEPROM.

9. The method according to claim 1, further comprising the steps of:

preceding said initial charging phase and after said insertion of said battery into said device for a first time, determining a voltage of said battery;

comparing said determined battery voltage to a lower voltage threshold and to a second, predetermined voltage value; and generating a first display status when said determined battery voltage is lower than said lower voltage threshold;

generating a second display status when said determined battery voltage is one of lower than or equal to said second, predetermined voltage value; and generating a third display status when said determined battery voltage is higher than said second, predetermined voltage value.

10. The method according to claim 9, further comprising the step of:

averaging said second voltage value from a predetermined voltage value that represents a discharged condition of said battery and a voltage value stored in an EEPROM that represents a maximum charging voltage of previously employed batteries.

11. The method according to claim 9, further comprising the steps of:

following said initial charging phase, comparing a currently generated value representing a previously drawn capacity to said base value for a maximum capacity to be drawn;

generating a fourth display status when said determined battery voltage is lower than said lower voltage threshold; and generating a number of further display statuses representing a charging condition of said battery dependent on a relationship of a current, generated value to said base value.

12. The method according to claim 11, wherein said first display status is generated during every charging phase following said initial charging phase when said current, generated value is between 0% and 33% of said base value;

wherein said second display status is generated when said current, generated value is between 34% and 66% of said base value;

wherein said third display status is generated when said current, generated value is between 67% and 99% of said base value; and further comprising the step of:

generating a fifth display status when said current, generated value is equal to said base value.

13. The method according to claim 1, further comprising the steps of:

monitoring a charging voltage curve during each charging phase implemented with maximum current; and ending said charging when said charging voltage has continuously dropped below a previously achieved value over a specific time span.

14. The method according to claim 13, further comprising the step of:

suspending said monitoring of said charging voltage curve at a beginning of charging during a predetermined time span, given potential switching of said charging current and during charging phases following said initial charging phase.

15. The method according to claim 1, further comprising the steps of:
    monitoring a temperature of said battery during charging; and
    prescribing at least two temperature thresholds comprising a lower temperature threshold and a higher temperature threshold having a value greater than said lower temperature threshold;
    wherein said battery is charged with full charging current below a lower temperature threshold;
    wherein said battery is charged with half said charging current between said lower temperature threshold and said higher temperature threshold; and
    wherein said battery is charged during a maintenance charging with one-sixth of said full charging current above said higher temperature threshold.

16. The method according to claim 15, wherein each temperature threshold is in turn divided into two sub-thresholds comprising a lower sub-threshold and a higher sub-threshold having a value greater than said lower sub-threshold, wherein in a case of rising temperature of said battery, an intensity of said charging current is switched at a higher sub-threshold of a respective temperature threshold and, in a case of dropping temperature, said intensity of said charging current is switched at a lower sub-threshold of a respective temperature threshold.

17. The method according to claim 1, further comprising the step of:
    monitoring a discharge curve of a voltage associated with said charging; and
    generating a first display status during one of: when said voltage lies in a range around a value representing a discharged condition of said battery, when a gradient of said discharge curve exceeds a predetermined, negative value, and was more highly negative for a predetermined plurality of times in succession, and when a lower end of a range around a value representing said discharged condition has been reached.

* * * * *